(No Model.)
F. DOUGLAS.
BICYCLE.
No. 469,627. Patented Feb. 23, 1892.
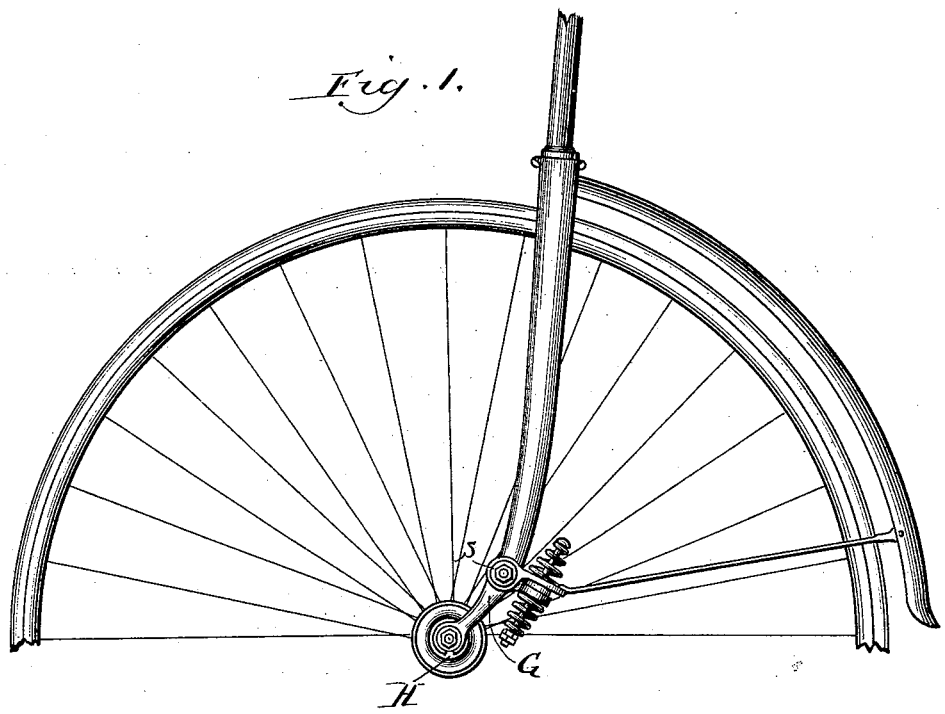
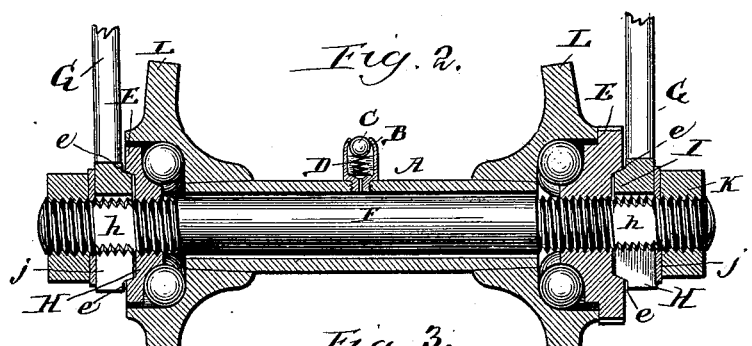
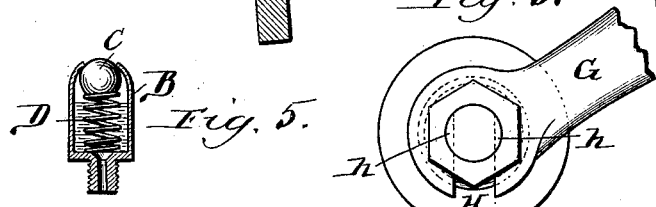
Witnesses
W. Rossiter
F. H. Mills
Inventor
Frank Douglas
By Banning Banning & Payson
Attys.

UNITED STATES PATENT OFFICE.

FRANK DOUGLAS, OF CHICAGO, ILLINOIS.

BICYCLE.

SPECIFICATION forming part of Letters Patent No. 469,627, dated February 23, 1892.

Application filed August 31, 1891. Serial No. 404,233. (No model.)

*To all whom it may concern:*

Be it known that I, FRANK DOUGLAS, a citizen of the United States, residing at Chicago, State of Illinois, have invented a new and useful Improvement in Bicycles, of which the following is a specification.

My invention relates more particularly to the front forks of a bicycle and their attachment to the front axle, with its ball-bearing adjusting-cones and its spring-ball-oiling device for the axle-bearings. Great difficulty has heretofore existed in securing by any method the spring-forks to the axle of a bicycle in such a way as to prevent one of the forks depressing more than the other and causing the wheel to strike on one side of the inside of the fork. In my invention the front fork is held firmly to the shaft of the front wheel in such a manner that it is impossible to compress one side of the spring-fork any more than the other at the same time.

In the accompanying drawings, Figure 1 represents the upper half of a bicycle-wheel with its hub-axle and my improved spring-fork all attached. Fig. 2 is a sectional longitudinal view of the wheel-hub with its spring-ball oil-cup in center and ball-bearings at either end, its adjusting-cones, the spring-fork ends cut through the center of their joint on the axle, the lock-nuts and washers outside of fork ends on the axle, and a full view of the axle passing through a sectional part of the hub. Fig. 3 is a view of one side of the front fork attached to the axle and locked firmly to it by the conical-shaped projection on the side of the fork having been forced into a corresponding recess in the adjusting-cone, as shown in dotted lines, by a lock-nut on the other side of the fork. Fig. 4 is an end view of the spring-fork, showing a slot in the fork, which is made to fit a flattened surface across the shaft and also showing the conical-shaped projection on the inner side of the fork. Fig. 5 is a small oil-receptacle for the axle-hub, which is bored out large enough to admit of a ball-valve held up by a small spring against the opening of the tube-shaped cup, which opening is closed in after the reception of the ball and spring to form a seat for the ball-valve.

Like letters of reference refer to like parts of each of the drawings.

A is the wheel-axle hub.

B is the oil-cup, screwed into the hub.

C is the ball which forms the valve to prevent the oil from leaking out of the hub.

D is the spring which holds the ball in position against the opening when not compressed by the oil-cup while oiling.

E E are adjusting-cones for the ball-bearings, which are screwed onto the axle F at each end, which adjusting-cones are made to form ball-bearings on one side and which hold the ball in check with the ball-bearing recess in the hub ends L L and have a conical-shaped recess under the outer sides, as $l\ l$.

G G are the fork ends, in which a slot H is cut to fit tightly over the flattened portions on the sides of the axle at $h\ h$.

I I are conical-shaped projections on the inner side of each of the fork-arms, made to correspond in shape to the recess in the adjusting-cones.

J J are loose washers on the side of the fork ends.

K K are nuts on the ends of the axle F for holding all the parts firmly in position when adjusted.

The method of fastening spring-fork ends to the axle herein shown and described is as follows: Before securing the adjusting-cones E E in their position on the axle F to form a ball-bearing for the hub in connection with the hub ends L L the axle F is passed through the hub and the balls for the bearings of the ends of the hub are placed in position, and the adjusting-cones E E are then screwed onto the axle F just far enough to make a free and easy turning bearing for the balls at both ends of the hub. The spring-fork ends G G, with the slots H, are placed onto the flattened portions $h\ h$ of the axle F at each end, when the washers J J and the nuts K K are screwed onto the axle F outside of the spring-fork ends G G, serving as a lock to the adjusting-cones E E and also serving to force the conical-shaped projections I I of the inner sides of the fork ends into the corresponding conical-shaped recesses $e\ e$ in the adjusting-cones E E, which serve to close the opening or slot H of the forks G G tightly down upon the flattened portions $h\ h$ of the axle F and firmly lock the forks to the shaft in such a manner as to hold the fork ends always parallel with each other in any movement of the spring-joint S. These taper projections may be made on the outer sides of the fork ends G G and forced into the washers J J, suitably recessed to receive them, or may be made on both sides of the fork ends, acting upon the adjusting-cones and the washers at the same time, so as to lock them together; but I prefer the projections on the inner sides of said surface as an excellent locking device for the adjusting-cone E. When it is necessary to adjust the ball-bearings by screwing up or changing the adjusting-cone E, the nut K is loosened, which loosens the conical clamp on the fork, and the adjusting-cone is placed in the position required and the nut K tightened, which serves the double purpose of clamping the fork ends tightly to the axle and holding the adjusting-cone firmly in position on the shaft. It is therefore obvious that with this conical-shaped locking device of the forks to the front axle it will be impossible to move one side of the fork-joint more than the other without twisting the axle F.

Having thus described the nature and object of my invention, what I claim as new, and desire to secure by Letters Patent, is—

1. A spring-joint bicycle-fork provided at its lower ends with a lateral projection, which is forced into a corresponding recess in an adjacent part formed to receive it for the purpose of holding the fork ends tightly against the flattened portions of the wheel-axle, substantially as described.

2. A ball-bearing adjusting-cone of a bicycle-hub, provided with an angular recess on its outer side, in combination with a corresponding angular locking projection of a bicycle-fork, substantially as described.

FRANK DOUGLAS.

Witnesses:
EPHRAIM BANNING,
SAMUEL E. HIBBEN.